United States Patent [19]

Rekers et al.

[11] 4,356,294

[45] Oct. 26, 1982

[54] PRODUCTION OF POLYOLEFINS HAVING IMPROVED ESCR

[75] Inventors: Louis J. Rekers, Wyoming; Richard J. French, Loveland; Harry W. Mayhew, Cincinnati, all of Ohio

[73] Assignee: National Petro Chemicals Corp., New York, N.Y.

[21] Appl. No.: 200,360

[22] Filed: Oct. 24, 1980

[51] Int. Cl.$^3$ .............................. C08F 4/02; C08F 4/24
[52] U.S. Cl. .................................. 526/100; 252/428; 252/437; 526/129; 526/348.6
[58] Field of Search ................................ 526/100, 129

[56] References Cited

U.S. PATENT DOCUMENTS 3,985,676 10/1976 Rekers et al. ...................... 526/100
4,118,340 10/1978 Rekers ................................. 526/100

Primary Examiner—Stanford M. Levin
Attorney, Agent, or Firm—Kenneth D. Tremain

[57] ABSTRACT

High density polyethylene resins of improved environmental stress crack resistance, (ESCR) for blow molding and related uses produced with chromium/aluminum based heat activated supported catalysts wherein the support is dried under controlled conditions to provide a selected silanol group population.

8 Claims, No Drawings

PRODUCTION OF POLYOLEFINS HAVING IMPROVED ESCR

This invention relates to olefin, e.g., ethylene polymerization, and the preparation and use of olefin polymerization catalysts. More particularly, the invention is directed to methods for the selective control in the production of olefin polymers of flexural properties such as creep and environmental stress crack resistance (ESCR) responsive to modifications in catalyst preparation.

BACKGROUND OF THE INVENTION

Polyethylene is non-polar and has comparatively low intermolecular forces of attraction. When polyethylene chains are under stress they therefore tend to slip and untangle themselves. This results in creep and cracking failures of the types found in environmental stress cracking, (ESC), the tendency of the polymer to become embrittled and crack under normal stress when in use with certain chemically 'aggressive' fluids such as household detergents, solvents, or acids.

A low molecular weight polymer tends to exhibit low resistance to mechanical impact or shock and to environmental stress cracking. Higher molecular weight (lower melt index) polymers provide increased chain entanglement, hence improved creep properties and higher ESC resistance. High density polyethylenes on the other hand, are relatively free from chain branching thus give less satisfactory performance in long term creep dependent properties since linear chains can more easily untangle themselves. Thus, at similar densities, higher molecular weight broader molecular weight distribution (high HLMI/MI ratio) polymers tend to have better creep properties and resistance to environmental stress cracking.

The incorporation of comonomer to introduce methyl or ethyl branches to the molecular chains reduces crystallinity and hence density tending to increase environmental stress crack resistance and improve creep properties with polymers having similar melt indices as chain slippage and disentanglement is rendered more difficult. However, factors which bring about improvement in stress crack resistance generally result in a compromise in other properties. Thus, lowering the melt index will result in a resin which is less processable and which has reduced stiffness. The development of resins of improved flexural properties, especially improved creep and stress crack resistance has accordingly been a subject of continuing interest.

Good environmental stress crack properties are particularly important for containers, where failure may result in spillage or seepage of the contents rendering the articles unsaleable and potentially dangerous. Structural designs employed in modern packaging often introduce sharp contours for aesthetic purposes which unfortunately introduce potential weaknesses at these high stress points. Resins of enhanced flexural strength, e.g., improved environmental stress crack resistance values offer better performance in such containers as well as in other contexts, e.g., pipes and electric cable coverings. (See for example, U.S. Pat. Nos. 2,997,453; 3,767,635; and 4,053,436.) While variations in stress crack properties may be observed as between resin candidates prepared under various operating conditions including catalyst preparation and polymerization, no characteristic correlation with a controlling variable has been reported. In fact, resin blending, e.g., with comonomer branched resins has commonly been employed to provide resins of desired characteristics. (See U.S. Pat. Nos. 3,179,719; 3,280,220; and 4,076,698) This is not always satisfactory as the branches in the component commonly employed to improve ESC resistance are concentrated in the chains of that component.

It has been demonstrated that ESC resistance is related to the very high molecular weight tail typically present in the distribution pattern for high density resins, and branching in this component is reported to have a more profound influence on ESC resistance than branching in the lower molecular weight chains (Hayes and Webster "Olefin copolymers by the Phillips Process" June 1964 pp. 223-4).

Such resins are commonly produced employing chromium based supported catalysts, such as any of those disclosed, for example, in U.S. Pat. Nos. 2,825,721; 2,951,816; or 3,985,676. Control of polymerization conditions in the use of such catalysts can effect modification in resin characteristics such as melt index or density, and introduction of other components to the catalyst such as titanium or aluminum values offer other beneficial changes in resin characteristics. However, no catalyst modification has been correlated to improved ESCR or like properties.

Porous supports of the type conventionally used for olefin polymerization catalyst are characterized in part by presence of reactive surface hydroxyl groups. Metallic or organometallic catalytic elements capable of reaction with such surface hydroxyl groups are typically employed in the preparation of supported olefin polymerization catalysts. The stereoconfiguration of the catalyst resulting upon heat activation is now believed in part to be due to the position and reactivity of the active surface hydroxyl groups and the extent and character of interactive engagement with the metallo or organometallo catalyst components, as more fully described hereinafter.

It has been reported that the population of surface hydroxyl groups on the surface of the support is one of the factors that controls molecular weight (Clark, *Industrial and Engineering Chemistry*, Vol. 59, No. 7, July 1967, pp. 29-34), the presence thereof increasing molecular weight. Hogan, in *Journal of Polymer Science:* Part A-1, Vol.8, pp. 2637-2652 (1970) also reports, after treatment with a chromium component, that removal of silanol groups increases polymerization activity. The hydroxyl groups are in part associated as surface water, and in part are bonded to silica as silanol groups. Both species are removable by volatilization, but are not readily distinguished. However, silanol level can be indirectly determined from total volatiles by difference, accounting for water by the method of Karl Fischer, indicating that the silanol groups in fact predominate at low water levels, to an extent of as much as 2:1 over waterbound hydroxyl.

In the manufacture of inorganic oxide supports for olefin polymerization catalysts, such as silica xerogels the support is commonly dried, as by spray drying, in the shortest period possible consistent with energy conservation measures. While high temperatures e.g., 600°-900° F. may be employed (see U.S. Pat. No. 4,053,436) the drying parameters are selected essentially to remove sorbed water. In any such operation, water and silanol groups are removed (See U.S. Pat. Nos. 4,059,542 and 4,086,409) to an extent depending upon the conditions employed; however, water predominates in the initial devolatilization, such that after calcination at 500° C. silica xerogel is reported to evidence a silanol population having an average distribution of 10 Å (Hogan, op cit) No correlation has been reported between the population and distribution of silanol groups in the support and the flexural properties of resins produced with chromium-containing catalysts based thereon.

These catalyst supports prior to coating with active catalyst components or precursors thereof, are commonly stored under conditions of low humidity to dryness because they are highly hydroscopic materials. It has even been found by Louis J. Rekers, et al., reported in commonly assigned application Ser. No. 800,586, filed May 25, 1977, abandoned, (incorporated herein by reference) that in aluminum doped chromium-containing supported catalyst systems very low, i.e., trace amounts of moisture may affect reproducibility in resins produced therewith. Thus, such supports may be dried to constant, controlled residual water level.

The removal of associated water in accordance with the aforementioned Rekers application affects surface hydroxyl groups to a limited degree, but under the conditions of such drying, silanol bound hydroxyl is the most difficult and hence generally the last to be removed.

BRIEF DESCRIPTION OF THE INVENTION

It has now been discovered that flexural properties such as creep and environmental stress crack resistance in polyolefin resins produced using a supported catalyst may be enhanced by controlling, and increasing the drying temperature to provide a selected level of surface hydroxyl groups in the heat treated uncoated or unimpregnated support. Specifically, it has been found that silica xerogel, especially the silica xerogel of U.S. Pat. Nos. 3,652,214-6 should be dried at temperatures above about 475° F., preferably at least 500° F. for a period of from about 1 to 5 hours and maintained in an essentially moisture free condition prior to interaction with active catalyst species or adjuvants including chromium-containing compounds and aluminum compounds reactive with surface hydroxyl. Employing this catalyst preparation technique results in a 10-20 percent up to 50 percent or more improvement in ESCR values for high density olefin resins so produced. Even more specifically, it has been determined that optimal practice of the invention is achieved in respect of ESCR properties in balanced relation to other desired resin characteristics by relating silanol group content in the support to the level and type of aluminum catalyst component reacted therewith and, more particularly, the residual water silanol/aluminum component relationships, as specified hereinafter.

Without wishing to be bound by an essentially theoretical elucidation, it is believed that drying conditions for the porous support, e.g., silica gel affects the presence, amount or location of the active surface hydroxyl (silanol) groups thereby establishing limits upon the number or placement, i.e., distribution of active sites. Specifically, the surface morphology of the porous support is believed to be critically modified such that resulting, e.g., chromium-based catalysts for olefin polymerization may be differentiated in use.

The improved environmental stress crack resistance of structures prepared from these resins may be attributable to shifts in segments or characteristics of the molecular weight distribution and particularly the typically occurring high molecular weight tail.

In accordance with a preferred embodiment of the present invention, a high surface area inorganic oxide catalyst support of substantial pore volume is treated at a temperature of at least about 475° F., preferably at least 500° F. or more, for a period sufficient to effect the controlled and selective removal of water and silanol groups, coated or impregnated in the treated (dried) condition with an active olefin polymerization catalyst component system, specifically comprising a chromium-containing component modified with an aluminum component, preferably an Al $(OR)_x$ species, in an amount preferably interrelated to the silanol content of the support, and thereafter heat activated, for use in an olefin polymerization reactor.

DETAILED DESCRIPTION OF THE INVENTION

The inorganic support materials useful in the present invention include those normally employed in supported chromium catalysts used in olefin polymerization such as those discussed in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. Nos. 3,652,214-6 which silica xerogels have a surface area in the range of 200 to 500 m$^2$/g and a pore volume greater than about 2.0 cc/g, a major portion of the pore volume being provided by pores having diameters in the range of 300 to 600 Å.

Such supports may be and preferably are provided before treatment in accordance with this invention with a regulated water content up to 15 to 25 weight percent based upon the support, preferably 0.25 to 6.0 weight percent, as disclosed in aforementioned copending and commonly assigned U.S. patent application Ser. No. 800,586 of Rekers, et al.

The support is subjected in a confined zone to a temperature of between about 475° and 800° F., preferably at least 500° up to 550° F. for a period of between about 1 and 6 hours, preferably 1.5 to 3.5 hours. Conditions preferably include the use of a dry stripping gas such as air or nitrogen, usually superheated to maintain the temperature of the particulate inorganic oxide support conveniently established as a fluidized bed. The dryer may also be indirectly heated. Typical conditions include provision of superheated dry air at a flow rate of 0.2 fps superficial lineal velocity to a bed of 125$\mu$ average particle size support.

The drying conditions are in general selected to control the removal of silanol groups to a level of about 2.8% to 4.0% relative to water and total volatiles (by difference). Preferably drying conditions are selected to provide some residual water retained on the surface for hydrolysis of the aluminum reactant, as discussed hereinafter. Most desirably for optimum control of resin properties, the weight ratio of water to silanol groups is from about 0.3 to 0.5. A rapid devolatilization rate provided by a higher temperature drying condition is best adapted to ensure desired removal of silanol population with preservation of a limited water level, as described, hence in this respect drying temperatures of 500° F. and higher are preferred.

While the so-treated support may be maintained in the modified surface condition indefinitely under proper essentially moisture-free conditions, it is preferably employed as soon as convenient in the preparation of catalyst, or catalyst intermediates, by reaction with an aluminum, chromium or titanium component. Preferably, the support is reacted with a chromium-containing component reactive with surface hydroxyl.

The chromium containing compounds useful in the present invention comprise any chromium containing compound capable of reacting with the surface hydroxyl groups of an inorganic support. Examples of such compounds include chromium trioxide, chromate esters such as the hindered di-tertiary polyalicyclic chromate esters, silyl chromate esters and phosphorus containing chromate esters disclosed in U.S. Pat. Nos. 3,642,749; and 3,704,287, and organophosphoryl chromium compounds such as those disclosed in U.S. Pat. No. 3,985,676 (incorporated herein by reference) which comprise the reaction product of chromium trioxide with an organophosphorus compound having the formula:

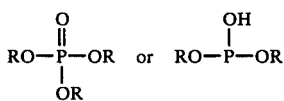

wherein R is alkyl, aralkyl, aryl, cycloalkyl or hydrogen, but at least one R is other than hydrogen. The preferred organophosphorus compounds are trialkyl phosphates such as triethyl phosphate.

The aluminum containing compounds employed herein are reactive with water, i.e., they undergo a controlled hydrolysis ranging through stages of partial hydrolysis (depending upon levels of available moisture in the system relative to aluminum compound charged) correlatable with selective aluminum species, and admixtures thereof. The aluminum compounds are also reactive with the surface hydroxyl groups of the inorganic support material, as are the reaction products with water.

Preferred aluminum compounds may be presented by the formula:

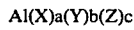

wherein X is R, Y is OR, and Z is H or a halogen; a is 0–3, b is 0–3, c is 0–3, and a+b+c equals 3; and R is an alkyl or aryl group having from one to eight carbon atoms.

Examples of such aluminum compounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide, etc.; alkyl aluminum compounds such as triethyl aluminum; triisobutyl aluminum etc.; alkyl or aryl aluminum halides such as diethyl aluminum chloride; aryl aluminum compounds such as triphenyl aluminum, aryloxy aluminum compounds such as aluminum phenoxide and mixed aryl, alkyl and aryloxy, alkyl aluminum compounds.

The novel catalyst of the present invention may be prepared by depositing the chromium containing compound and the aluminum compound on the dried inorganic support in any suitable manner such as by vapor coating or by impregnating the support with solutions of the chromium containing compound and the aluminum compound in a suitable inert solvent which is normally an anhydrous organic solvent. Such organic solvents include aliphatic, cycloalkyl, and alkylaryl hydrocarbons and their halogenated derivatives. A preferred organic solvent is dichloromethane. The chromium and aluminum compounds may be applied together or individually. In applicants' usual method of catalyst preparation, the moisture level is adjusted first and the support is then impregnated with the chromium containing compound and finally the support is modified with the aluminum compound.

In the case of spray coating, the aluminum compound represented here by aluminum sec-butoxide, is diluted with one pore volume (relative to silica gel) methylene chloride and sprayed onto the neat or chromium coated support at 90° F. over a period of one hour (during which 3 bed turnovers are accomplished). The coated catalyst is dried at 235° F. for two to six hours at 10–15 in. Hg, vacuum to remove volatiles. In a preferred modification of this procedure, the aluminum compound is slurried with two pore volumes of anhydrous methylene chloride, and the solvent removed by drying as aforesaid.

Vapor coating may be achieved in similar manner by spraying the support, maintained at a temperature of 400° F., with the aluminum compound at 175° F. over a period of 1.5 hours, then raising the temperature for drying, to 500° F. maintained for 1 hour at maximum vacuum.

The gel at regulated moisture level may also be simply slurried in a suitable anhydrous solvent such as methylene chloride with the aluminum compound and the chromium compound, and thereafter dried to remove volatiles.

When an organophosphoryl chromium compound of the type disclosed in the aforesaid U.S. Pat. No. 3,985,676 is utilized in the practice of the present invention, it is preferred to employ the particular catalyst preparation techniques described in that application, the disclosure of which is incorporated by reference herein. In such instance the organoaluminum compound may be applied to the catalyst support under conditions similar to those utilized for deposition of the organophosphoryl chromium compound.

The most effective catalysts have been found to be those containing the chromium compound in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts outside of these ranges can be used to prepare operable catalysts.

After the chromium containing compound and the aluminum compound have been deposited on the inorganic support and the support redried, the support is activated by heating in a non-reducing atmosphere, preferably in an oxygen containing atmosphere, at a temperature above about 200° F. up to the decomposition temperature of the support. Typically, the supported compositions are heated at a temperature of from 800° F. to 2000° F. The heating time may vary, for example, depending on the temperatures used, from ½ hour or less to 50 hours or more. Normally the heating is carried out over a period of 2 to 12 hours. The non-reducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2-3 ppm of water.

Although anhydrous solvents in the deposition procedure, and dehumidified air in drying or heat activation are normally employed, in practice control of moisture on the support following drying in accordance with the invention is found sufficient to achieve the objects of the invention. It is of course also possible at constant support water level to adjust by moisture present in the solvent treatment systems. Time of reaction or interaction of the aluminum compound does not appear to be critical, and deposition is normally effected under ambient conditions, as in a conventional blender-coater apparatus.

In accordance with the disclosure of U.S. Pat. No. 4,100,104 of Rekers, et al. and incorporated herein by reference, the catalyst may be prepared by separately activating the catalyst after the addition of each separate component.

The absolute level of aluminum compound, the ratio of water to aluminum compound and the ratio of silanol groups to aluminum compound is considered important to the controlled polymerization of the present invention. In general, the proportion of aluminum compound may range from about 0.1 to 10% by weight, based on the support, preferably from 0.35 to 5.5% and will, at constant moisture level in the preparation, evidence in use decreasing molecular weight with aluminum level and increasing molecular weight distribution as measured by melt index values on resin produced. The water to aluminum molar ratio may vary from an essentially anhydrous system to about 4.0 (weight ratio 0.025 to 60), preferably 0.5 to 2.0, with lower values correlating with lower molecular weight and intermediate shear response, or molecular weight distribution. Water levels in the support are preferably adjusted to and maintained at a fixed ratio, i.e., an individual value in the range of 0.25 to 6.0 weight percent most preferably within the limit ±0.15%. Optimum performance has been exhibited in this respect at 1.85% aluminum to 0.60±0.1% water, or 3.7% aluminum to 1.25±0.1% water, although highest melt index values have been obtained at 2.5% water.

The weight ratio of silanol population to aluminum compound is also important in optimizing the practice of the invention. In general, a ratio of 0.55 to 1.10 is found desirable, with best performance in the range of 0.75 to 0.86. At 3.7% aluminum and 1.25% water, an initial silanol level of above 3% has given optimum results.

It is understood that the initial measured silanol population may and in accordance with the preferred embodiment is involved in interreaction with the chromium or other metallo or organometallo component prior to contact with the aluminum compound, hence the actual ratios involved in the aluminum reaction stage are different from those expressed as initial silanol population. The artisan will of course adjust initial silanol levels having regard for the level and type of primary surface reactant consistently with the Examples set forth herein. It will of course also be understood that silanol adjustment may be accomplished following impregnation with the chromium component.

The drying step for the silica gel or other inorganic oxide support is effected upon the xerogel in its finished state as commercially available, thus the drying is distinct from any step employed in the manufacture of the gel. The drying must be accomplished prior to coating with the aluminum compound and in accordance with the usual technique precedes deposition of any metallo or organometallo catalyst component.

The drying is typically carried out at 500° F. for 4 hours at an air flow of 0.2 FPS lineal velocity in a heated rotating blade dryer or a fluidized bed drier. While time and temperature of drying are interdependent variables in this process such that, in a general sense, somewhat reduced time of drying is required at higher temperatures, etc. the effect is believed to be somewhat nonlinear such that adjustment of each variable within the indicated ranges may be effected in a manner understood by the artisan.

The dried support having modified silanol surface morphology resulting from the drying treatment remains capable of resorbing water, and to some extend rehydrolyzing sites to regenerate silanol functionality. However, this can be adequately controlled by regulating water level, as for example in accordance with the aforementioned Rekers, et al appln. Ser. No. 800,586.

In the coating stage and before addition of the aluminum component, the water content is adjusted to within limits appropriate to effect controlled hydrolysis of the aluminum compound.

The heat-activated supported chromium and aluminum compounds of the present invention may be used in combination with metallic and/or non-metallic reducing agents to provide novel catalyst systems for the polymerization of olefins. Examples of metallic reducing agents include trialkyl aluminums, such as triethyl aluminum, triisobutyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. The non-metal reducing agents include alkyl boranes such as triethyl borane, triisobutyl borane, and trimethyl borane and hydrides of boron such as diborane, pentaborane, hexaborane and decaborane.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratio are from about 0.1/1 to 20/1, and in terms of weight are from about 0.4% to about 75% by weight.

The heat-treated, supported chromium containing compound and aluminum compound may be combined with the metallic or non-metallic reducing agent prior to being fed to an olefin polymerization reactor or these two components may be fed separately to an olefin polymerization reactor.

In proportioning the amount of metallic or non-metallic reducing agent to the amount of chromium compound used in the catalyst systems of the present invention, fairly wide latitude is available, but some guidelines have been established consistent with good yield, favorable polymer properties and economic use of materials. For example, in the use of metallic and/or non-metallic reducing agents with an amount of chromium compound sufficient to yield about 1% Cr by weight of the support the parameters set forth below are representative. The atomic ratios are based upon a calculation of the metal in the metallic reducing agent and/or the non-metal in the non-metallic reducing agent versus the chromium content of the chromium compound on the support.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the preferred catalyst compositions of this invention are employed in conventional polymerization processes for olefins, in particular 1-olefins having 2-8 carbon atoms such as ethylene, propylene, 1-butene, 3-methylbutene-1, 4-methyl pentene-1 alone or in admixture, and copolymerization thereof with ethylenically unsaturated monomers such as vinyl acetate, acrylonitrile, or methyl methacrylate with or without modifiers, chain transfer or termination agents and the like, as known in the art. Such polymerizations may be effected under temperature and pressure conditions generally employed in the art e.g., temperatures of from about 40° to about 200° C. and preferably from about 70° to 110° C., and pressures of from 200 to 1000 psig and preferably from 300 to 800 psig, as are used in slurry or particle form polymerizations.

The following examples illustrate preferred modes of carrying out the preparation of the novel catalyst hereof, and of the use of such catalyst for the preparation of polyethylenes of modified and controlled rheological properties. It will be understood that the examples are illustrative only and that various modifications may be made in the specified parameters without departing from the scope of the invention.

Total Volatiles (TV) was measured under heating conditions of 1000° F. for 4 hours, and water content was determined employing a titration technique in pyridine using Karl Fischer reagent, the difference representing silanol group content of the silica gel. Each may be expressed as calculated by weight based upon the support. Silanol group content as referred to herein is expressed as the difference between total volatiles and Karl Fischer water hence may not accurately state, although it appropriately reflects silanol group population.

While environmental stress crack resistance (ESCR) may be determined in accordance with various standard tests including ASTM D-1693-70 (Bell ESC), values reported in the following examples, were measured as follows: Ten 12 oz. rectangular bottles are blow molded conventionally at 50 psig blow air, 10 sec. blow, 15 second cycle, 60° F. mold temperature to a standard weight of 26-30 grams. Any flash is removed from the bottles to provide a smooth, flat surface and the bottles are conditioned at room temperature for at least 24 hours. A solution of 350 ml Igepal CO 630, an alkyl-aryl polyethylene glycol, in 3500 ml of hot water is prepared and then cooled to room temperature. 90 ml. of the detergent solution is placed in each bottle, which is then capped and the interior uniformly coated by inversion of the bottle. The bottles are tested in an enclosed compartment stabilized and maintained at 140° F. and an internal pressure of 5 psig on each bottle.

The test, for failure through stress cracking (container rupture involving pressure loss, automatically recorded) is conducted employing 10 test bottles and for a period of seven (7) days or, optionally, until 100% failure. The hours for failure of 10%, 50%, and 90% of the samples are shown as values of $F_{10}$, $F_{50}$ and $F_{90}$ corrected for oven position; or extrapolated or interpolated as necessary from the test curve.

In the following Examples, Polypor silica gel (National Petro Chemicals Corp.), treated at different drying temperatures was employed as the support for a chromium/aluminum olefin polymerization catalyst and environmental stress crack resistance values for polymer produced was recorded.

EXAMPLE I

Olefin polymerization catalyst was prepared by impregnating silica gel (surface area 331 m²/g, pore volume 2.36 cc/gm, the majority of pores contributing to pore volume ranging between 300-600µ, %H$_2$O 1.7, %TV 8.7% in acetone dried condition) dried in a heated rotating blade dryer at the temperatures shown in Table I. The dried support was then treated with a methylene chloride solution of an organophosphoryl chromium reaction product (see U.S. Pat. No. 3,985,676) to a level of 0.9 wgt.% chromium calculated as Cr. The treated support was then impregnated in similar manner with aluminum sec-isobutoxide to a level of 3.7% calculated as Al, and then heat activated at 1650° F. for 6 hours.

The resulting catalyst was employed in conventional manner to produce ethylene polymer (feed: ethylene 5 mol %, butene 0.7 weight percent ethylene and solvent), at synthesis conditions of 195° F., 1 ppm TEB, $H_2/C_2=(m)=0.6$ Conditions and results are set forth in Table I, as follows:

TABLE I

| Run # | Drying Temperature (°F.) | Time (Hr) | MI powder | Density Annealed | $F_{50}$,[1] ESCR, hrs., |
|---|---|---|---|---|---|
| 1 | 420 | 5 | 0.62 | 0.9532 | 15.1 |
| 2 | 500 | 5 | 0.62 | 0.9539 | 18.4 |
| 3 | 540 | 5 | 0.64 | 0.9567 | 19.4 |

TABLE I-continued

| Run # | Drying Temperature (°F.) | Time (Hr) | MI powder | Density Annealed | $F_{50}$,[1] ESCR, hrs., |
|---|---|---|---|---|---|
| 4 | 800 | 5 | 0.40 | 0.9529 | 23.5 |

[1] The results are normalized for comparative purposes to MI 0.33 and density .9525, employing standard data correlations for such values, at a 95% confidence level. $F_{50}$ values corrected for oven positon but before normalization were 11.85, 12.0, 7.3 and 19.2 hrs., respectfully.

The following runs show the influence of time and temperature variation upon the surface hydroxyl content of the treated silica gel.

EXAMPLE II

Silica gel having a surface area of 331 m²/g and a pore volume of 2.36 cc/gm, the majority of pores contributing to pore volume in range 300–600μ in an acetone wet (ca. 7%) condition and exhibiting 1.7% $H_2O$ and 8.7% total volatiles is passed into a fluidized bed dryer and then subjected to the flow of super heated dry air at a gas flow rate of 0.2 fps superficial lineal velocity. Upon attainment of a uniform bed temperature (about 20 minutes elapsed time) the runs commenced, the drying being conducted for varying temperatures and times with results as follows:

TABLE II

| Run # | Temperature °F. | Time (hrs.) | % $H_2O$ | % TV-% $H_2O$ |
|---|---|---|---|---|
| 5 | 325 | 0.5 | 0.37 | 4.00 |
| 6 | 325 | 1.5 | 0.24 | 3.55 |
| 7 | 408 | 1.0 | 0.25 | 3.68 |
| 8 | 500 | 0.5 | 0.31 | 3.44 |
| 9 | 500 | 1.5 | 0.21 | 3.14 |
| 10 | 550 | 6 | 0.17 | 3.08 |
| 11 | 550 | 6 | 0.24 | 3.07 |

It will be understood that the foregoing Examples are illustrative only of the effect of drying conditions, and are not representative of results achievable with optimization. Thus, one may with reasonable consistency provide ESCR, $F_{50}$ values of at least about 25 hrs. (normalized to 0.33 MI and 0.9525 density), as compared to values of 17 hours experienced for comparable resins with typical drying temperatures previously employed i.e. 420° F.

What is claimed is:

1. A method of improving the flexural properties in olefin resins by control of catalyst characteristics comprising polymerizing at least one olefin in the presence of a heat activated chromium containing catalyst system, said catalyst being modified by the incorporation of from about 0.1 to 10% by weight of an aluminum compound reactive with surface hydroxyl on the support said support comprising a controlled, reduced level of silanol groups produced by a drying treatment of a silica xerogel at a temperature of at least about 475° F. for a period of at least 1 hour, prior to interaction with said aluminum compound, said support at the time of interaction with said aluminum compound comprising a controlled selected level of water, in the range of 0.25 to 6.0% by weight of the support, and wherein the weight ratio of water to aluminum compound is 0.025 to 60, and the weight ratio of silanol group content to aluminum compound is 0.55 to 1.10.

2. The method of claim 1, wherein the drying treatment precedes deposition of any metallo or organometallo catalyst component.

3. The method of claim 1, wherein the chromium component is an organophosphoryl chromium reaction product interacted with the support to provide a level of 0.25 to 2.5 calculated as Cr.

4. The method of claim 3 wherein said silica gel is a silica xerogel having a surface area in the range of about 200 to about 500 m²/g and a pore volume greater than about 2.0 cc/g, a major portion of the pore volume being provided by pores having diameters in the range of from about 300 to about 600 angstrom units said xerogel having a silanol group level following said drying treatment of about 2.8 to 4.0% by weight of the support.

5. The method of claim 4 wherein said support at the time of interaction with said aluminum compound comprises a controlled selected level of water, in the range of 0.25 to 6.0±0.15% by weight of the support.

6. The method of claim 5 wherein the weight ratio of water to aluminum compound is 0.025 to 60.

7. The method of claim 6 wherein the weight ratio of silanol group content to aluminum compound is 0.55 to 1.10.

8. The method of claim 7 wherein ethylene comprises at least about 90% of the polymerizable olefins, including the further step of recovering a polyolefin exhibiting an environmental stress crack resistance ($F_{50}$) of at least about 20 hrs. at a density of at least 0.9450 and a melt index less than 0.5.

* * * * *